United States Patent
Miyatake et al.

(12) 
(10) Patent No.: US 6,545,116 B1
(45) Date of Patent: Apr. 8, 2003

(54) FLAME RETARDANT FOR THERMOPLASTIC RESIN AND FLAME-RETARDANT RESIN COMPOSITION

(75) Inventors: Nobuo Miyatake, Takasago (JP); Kazunori Takikawa, Takasago (JP); Daisuke Nakamori, Takasago (JP); Shigeki Hamaguchi, Takarazuka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/646,219

(22) PCT Filed: Dec. 3, 1999

(86) PCT No.: PCT/JP99/06783

§ 371 (c)(1),
(2), (4) Date: Sep. 15, 2000

(87) PCT Pub. No.: WO00/34392

PCT Pub. Date: Jun. 15, 2000

(30) Foreign Application Priority Data

Dec. 8, 1998 (JP) ............................................ 10-348775
Feb. 9, 1999 (JP) ............................................ 11-031029

(51) Int. Cl.[7] ........................ C08L 83/04; C08L 83/05; C08L 83/07; C08L 83/14
(52) U.S. Cl. .............................. 528/43; 528/31; 528/32; 528/33; 528/34; 528/35; 525/100; 525/393; 525/474; 525/477; 525/478

(58) Field of Search .......................... 524/588; 525/446, 525/393, 63, 479, 442, 100, 474, 477; 528/31, 32, 33, 34, 35, 43

(56) References Cited

U.S. PATENT DOCUMENTS

| 4,690,986 | A | * | 9/1987 | Sasaki et al. |
| 4,888,388 | A | * | 12/1989 | Hongo et al. |
| 4,939,206 | A | * | 7/1990 | Wang |
| 5,045,595 | A | * | 9/1991 | Wang |
| 5,223,586 | A | * | 6/1993 | Mautner et al. |
| 5,268,403 | A | * | 12/1993 | Sasaki et al. |

FOREIGN PATENT DOCUMENTS

| DE | 3939846 A1 | 7/1990 |
| DE | 198 50 453 A1 | 6/1999 |
| EP | 0 829 521 A1 | 3/1998 |

* cited by examiner

*Primary Examiner*—Peter Szekely
(74) *Attorney, Agent, or Firm*—Armstrong, Westerman & Hattori, LLP

(57) ABSTRACT

A flame retardant for thermoplastic resins comprising polyorganosiloxane crosslinked particles having a toluene-insoluble matter content of at least 50% by weight and an average particle size of 0.01 to 2,000 μm, which provides flame retardant resin compositions of low environmental load generating no harmful gas at the time of burning and having an excellent impact resistance by the incorporation thereof into thermoplastic resins.

19 Claims, No Drawings

ND FLAME-
FLAME RETARDANT FOR THERMOPLASTIC RESIN AND FLAME-RETARDANT RESIN COMPOSITION

TECHNICAL FIELD

The present invention relates to a flame retardant for thermoplastic resins and a flame retardant resin composition.

BACKGROUND ART

Thermoplastic resins have been widely used in electric and electronic parts, office automation devices, household articles and building materials. However, thermoplastic resins have the defect that they are generally inflammable. Therefore, the improvement has been attempted by incorporation of various flame retardants. For instance, incorporation of organic halogen-containing compounds or organic phosphorus compounds has been widely conducted for this purpose. However, most of the organic halogen-containing compounds and organic phosphorus compounds have a problem in toxicity. In particular, organic halogen-containing compounds have the problem that they generate a corrosive gas at the time of burning.

In order to solve these problems, it has been investigated to impart a flame resistance by incorporation of polyorganosiloxane compounds (hereinafter also referred to as "silicone"). For example, Japanese Patent Publication Kokai No. 54-36365 discloses that a flame retardant resin is obtained by kneading a non-silicone polymer with a silicone resin composed of monoorganopolysiloxane.

Japanese Patent Publication Kokoku No. 3-48947 discloses that a mixture of a silicone resin and a salt of a group IIA metal imparts a flame retardancy to thermoplastic resins.

Japanese Patent Publication Kokai No. 8-113712 discloses a process for obtaining a flame retardant resin composition by dispersing into thermoplastic resins a silicone resin prepared by mixing 100 parts by weight of a polyorganosiloxane with 10 to 150 parts by weight of a silica filler.

Japanese Patent Publication Kokai No. 10-139964 discloses that a flame retardant resin composition is obtained by incorporating a solvent-soluble silicone resin having a weight average molecular weight of 10,000 to 270,000 into a non-silicone resin containing an aromatic ring.

However, although the silicone resins disclosed in the above publications impart a flame retardancy to some extent, they lower the impact resistance of resin compositions if incorporated in an excess amount and, therefore, it has been difficult to obtain flame retardant resin compositions having well-balanced flame resistance and impact resistance.

It is an object of the present invention to provide a flame retardant of low environmental load which does not generate a harmful gas when burns.

A further object of the present invention is to provide a flame retardant thermoplastic resin composition of low environmental load which does not generate a harmful gas when burns and which has an excellent impact resistance.

DISCLOSURE OF INVENTION

The resent inventors have found, as a result of making an intensive study in order to achieve the above objects, that crosslinked particles of a specific polyorganosiloxane can be used as a flame retardant for thermoplastic resins, and thermoplastic resin compositions containing the polyorganosiloxane crosslinked particles are excellent not only in flame resistance but also in impact resistance.

The present invention provides a flame retardant for thermoplastic resins comprising crosslinked particles of a polyorganosiloxane which have a toluene-insoluble matter content of at least 50% by weight and an average particle size of 0.01 to 2,000 $\mu$m.

Preferably, the polyorganosiloxane crosslinked particles are prepared by emulsion polymerization of a mixture of 50 to 99.5% by weight, especially 60 to 98.5% by weight, of an organosiloxane and/or a difunctional silane compound, 0.5 to 50% by weight, especially 0.5 to 39% by weight, of a silane compound having a functionality of at least 3, and 0 to 40% by weight, especially 0.5 to 30% by weight, of a polymerizable vinyl group-containing silane compound.

Further, the present invention provides a flame retardant resin composition comprising a thermoplastic resin and 0.1 to 50 parts by weight of the above-mentioned flame retardant per 100 parts by weight of the thermoplastic reisn.

BEST MODE FOR CARRYING OUT THE INVENTION

The flame retardant for thermoplastic resins of the present invention comprises crosslinked particles of a polyorganosiloxane which have a toluene-insoluble matter content of not less than 50% by weight and an average particle size of 0.01 to 2,000 $\mu$m.

The term "polyorganosiloxane" as used herein indicates a polyorganosiloxane, a modified polyorganosiloxane wherein 1 to 20% by weight, preferably 1 to 10% by weight, of a polyorganosiloxane is replaced with an organic polymer having no polyorganosiloxane segment (e.g., butyl acrylate polymer, styrene-butyl acrylate copolymer, styrene-acrylonitrile copolymer, or methyl methacrylate polymer), and the like. The modified polyorganosiloxane includes a modified polyorganosiloxane wherein a polyorganosiloxane and an organic polymer having no polyorgaosiloxane segment are chemically bonded, and a modified polyorganosiloxane wherein a polyorganosiloxane and an organic polymer having no polyorgaosiloxane segment are merely coexist. The content of the organic polymer in the modified polyorganosiloxane is not more than 20% by weight, preferably not more than 10% by weight.

The content of toluene-insoluble matter in the polyorganosiloxane crosslinked particles measured by immersing 0.5 g of the crosslinked particles in 80 ml of toluene at room temperature for 24 hours is from 50 to 100% by weight, preferably 60 to 100% by weight. Also, the average particle size of the crosslinked particles obtained by a light scattering method or electron microscopic observation is from 0.01 to 2,000 $\mu$m, preferably from 0.01 to 1,000 $\mu$m. If the content of toluene-insoluble matter is small, the flame resistance-impact resistance balance tends to be deteriorated. If the average particle size is too small or too large, the flame resistance-impact resistance balance tends to be deteriorated.

It is preferable from the viewpoint of good flame resistance-impact resistance balance that the variation coefficient in particle size distribution of the above-mentioned average particle size (100×standard deviation/average particle size (%)) is from 10 to 100%, especially 20 to 80%. It is difficult to obtain the particles having a variation coefficient of less than 10%. If the variation coefficient is too large, the flame resistant effect tends to be lowered.

The polyorganosiloxane crosslinked particles can be prepared, for instance, by polymerizing a polyorganosiloxane-forming component comprising (a) an organosiloxane and/or a difunctional silane compound, (b) a silane compound having a functionality of at least 3, and optionally (c) a polymerizable vinyl group-containing silane compound. Preferably, the polyorganosiloxane crosslinked particles is prepared by polymerizing, for instance, a polyorganosiloxane-forming component comprising (a-1) an organosiloxane having an aromatic group and/or a difunctional silane compound having an aromatic group, (a-2) an organosiloxane having no aromatic group and/or a difunctional silane compound having no aromatic group, (b) a silane compound having a functionality of at least 3, and (c) a polymerizable vinyl group-containing silane compound.

The component (a-1) serves to impart a flame resistance. As the component (a-1) is used at least one member selected from the group consisting of organosiloxanes having an aromatic group and difunctional silane compounds having an aromatic group. Examples of such an organosiloxane are, for instance, cyclic siloxanes such as trimethyl-triphenylcyclotrisiloxane and tetramethyltetraphenylcyclotetrasiloxane. Examples of the difunctional silane compound are, for instance, diphenyldimethoxysilane, diphenyldiethoxysilane, diphenyldichloro-silane, phenylmethyldimethoxysilane, phenylmethyldichlorosilane, and the like. Of these, diphenyldimethoxysilane and diphenyldichlorosilane are preferably used from the viewpoints of economy and reactivity.

The component (a-2) constitutes the main backbone of polyorganosiloxane chain, and as the component (a-2) is used at least one member selected from the group consisting of organosiloxanes having no aromatic group and difunctional silane compounds having no aromatic group. Examples of such an organosiloxane are, for instance, a cyclic siloxane such as hexamethylcyclotrisiloxane, octamethylcyclotetrasiloxane, decamethylcyclopentasiloxane or dodecamethylcyclohexasiloxane, a linear organosiloxane oligomer, and the like. Examples of the difunctional silane compound having no aromatic group are, for instance, diethoxydimethylsilane, dimethoxydimethylsilane, 3-chloropropylmethyldimethoxysilane, 3-glycidoxypropylmethyldimethoxysilane, heptadecafluorodecylmethyl-dimethoxysilane, trifluoropropylmethyldimethoxysilane, octadecylmethyldimethoxysilane, and the like. Of these, octamethylcyclotetrasiloxane and mixtures of at least two cyclic siloxanes are preferred from an economical point of view.

The silane compound (b) having a functionality of at least 3 is used to introduce a crosslinked structure by the copolymerization with the components (a-1) and (a-2), thereby imparting a rubber elasticity to the polyorganosiloxane, while causing to produce incombustibles. Examples thereof are, for instance, tetrafunctional and trifunctional alkoxysilane compounds such as tetraethoxysilane, methyltriethoxysilane, methyltrimethoxysilane, ethyltriethoxysilane, 3-glycidoxypropyltrimethoxysilane, heptadecafluorodecyltrimethoxysilane, trifluoropropyltrimethoxysilane, octadecyltrimethoxysilane and phenyltriethoxysilane, and others. Of these, tetraethoxysilane, methyltriethoxysilane, methyltrimethoxysilane and phenyltrimethoxy-silane are preferred from the viewpoint of being effective in flame retardation.

The polymerizable vinyl group-containing silane compound (c) is a component for introducing polymerizable vinyl groups into the side chains or molecular chain ends of copolymers by the copolymerization with the components (a-1), (a-2) and (b) and the like. The polymerizable vinyl group serves to raise the dispersibility of the crosslinked particles into thermoplastic resins. Further, the polymerizable vinyl group serves as a crosslinking point which forms crosslinkages by a radical reaction between the polymerizable vinyl groups through a radical polymerization initiator as used in usual radical polymerization, and serves as a grafting point when grafting a vinyl monomer.

Examples of the polymerizable vinyl group-containing silane compound (c) are, for instance, a silane comound of the formula (I):

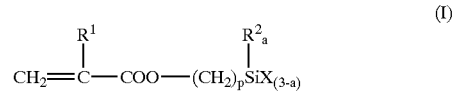

wherein $R^1$ is hydrogen atom or methyl group, $R^2$ is a monovalent hydrocarbon group having 1 to 6 carbon atoms, X is an alkoxyl group having 1 to 6 carbon atoms, a is 0, 1 or 2, and p is an integer of 1 to 6, a silane compound of the formula (II):

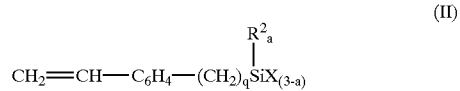

wherein $R^2$, X and a are as defined above, and q is 0 or an integer of 1 to 6, a silane compound of the formula (III):

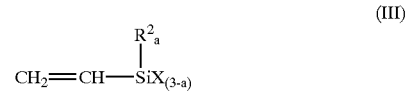

wherein $R^2$, X and a are as defined above, a silane compound of the formula (IV):

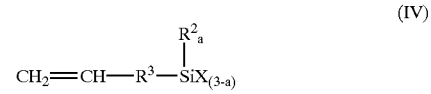

wherein $R^2$, X and a are as defined above, and $R^3$ is a bivalent hydrocarbon group having 1 to 6 carbon atoms, a silane compound of the formula (V):

wherein $R^2$, X and a are as defined above, and $R^4$ is a bivalent hydrocarbon group having 1 to 18 carbon atoms, and the like.

Examples of the group $R^2$ in the formulas (I) to (V) are, for instance, an alkyl group such as methyl group, ethyl group or propyl group, phenyl group, and the like. Examples of the group X are, for instance, methoxy group, ethoxy group, propoxy group and butoxy group and the like. Examples of the group $R^3$ in the formula (IV) are, for instance, methylene group, ethylene group, propylene group butylene group and the like. Examples of the group $R^4$ in the formula (V) are, for instance, methylene group, ethylene group, propylene group butylene group and the like.

Examples of the silane compound (I) are, for instance, β-methacryloyloxyethyldimethoxymethylsilane, γ-methacryloyloxypropyl-dimethoxymethylsilane, γ-methacryloyloxypropyltrimethoxysilane, γ-methacryloyloxypropyldimethylmethoxysilane,
γ-methacryloyloxypropyltriethoxysilane,
γ-methacryloyloxypropyldiethoxymethylsilane,
γ-methacryloyloxypropyltripropoxysilane,
γ-methacryloyloxypropyldipropoxymethylsilane,
γ-acryloyloxypropylmethyldimethoxysilane,
γ-acryloyloxypropyltrimethoxysilane, and the like. Examples of the silane compound (II) are, for instance, p-vinylphenyldimethoxymethylsilane, p-vinylphenyltrimethoxysilane, p-vinylphenyltriethoxysilane, p-vinylphenyldiethoxymethylsilane, and the like. Examples of the silane compound (III) are, for instance, vinylmethyldimethoxysilane, vinylmethyldiethoxysilane, vinyltrimethoxysilane, vinyltriethoxysilane, and the like. Examples of the silane compound (IV) are, for instance, allylmethyldimethoxysilane, allylmethyldiethoxysilane, allyltrimethoxysilane, allyltriethoxysilane, and the like. Examples of the silane compound (V) are, for instance, mercaptopropyltrimethoxysilane, mercaptopropyldimethoxymethylsilane, and the like. Of these, silane compounds of the formulas (I), (II) and (V) are preferably used from the economical point of view.

In case that the above-mentioned polymerizable vinyl group-containing silane compounds (c) are of trialkoxysilane type, they also serve as a crosslinking agent. Also, in case of using the component (c), it is preferable to use it in an amount of at least 0.5% by weight so as to exhibit its effect.

With respect to the proportions of the components (a-1), (a-2), (b) and (c) in the polyorganosiloxane-forming component in the polymerization thereof, it is preferable that the proportion of the component (a-1) is from 0.5 to 70% by weight, especially 2 to 70% by weight, more especially 5 to 70% by weight, the proportion of the component (a-2) is from 29.5 to 99% by weight, especially 29 to 96.5% by weight, more especially 25 to 90% by weight, the proportion of the silane compound (b) having a functionality of at least 3 is from 0.5 to 50% by weight, especially 0.5 to 39% by weight, more especially 3 to 29% by weight, and the proportion of the polymerizable vinyl group-containing silane compound (c) is from 0 to 40% by weight, especially 0.5 to 30% by weight, more especially 2 to 20% by weight. In each of the components (a-1) and (a-2), the ratio of the organosiloxane to the difunctional silane compound is usually from 100/0 to 0/100 by weight, especially from 98/2 to 40/60 by weight.

If the proportion of the component (a-1) is too small, the obtained crosslinked particles tend to exhibit the flame resistance-imparting effect with difficulty. If the proportion of the component (a-1) is too large, the cost tends to increase. If the proportion of the component (a-2) is too small, the cost tends to increase, and if the proportion of the component (a-2) is too large, the flame resistance tends to lower. If the proportion of the component (b) is too small or too large, the balance between the flame retardation effect and the impact resistance-imparting effect of the obtained crosslinked particles tends to be deteriorated. The component (c) is an optional component. If the proportion thereof exceeds 40% by weight, the flame resistance-improving effect of the crosslinked particles tend to be exhibited with difficulty.

Preferably, the polyorganosiloxane crosslinked particles are prepared by emulsion-polymerizing the polyorganosiloxane-forming component comprising the components (a-1), (a-2) and (b) and optionally the component (c).

The emulsion polymerization can be carried out by known methods, for example, as disclosed in U.S. Pat. Nos. 2,891,920 and 3,294,725.

For example, the polyorganosiloxane-forming component is emulsified and dispersed into water by mechanical shearing in the presence of an emulsifier and the obtained emulsion can be subjected to polymerization under an acidic condition. In case that emulsified droplets having a size of not less than several micrometers have been produced by mechanical shearing, it is possible to control the average particle size of the polyorganosiloxane particles obtained after the polymerization within the range of 0.02 to 0.5 μm depending on the amount of an emulsifier used. It is also possible to obtain the particles whose variation coefficient (100×standard deviation/average particle size) in the particle size distribution of which is not more than 70%.

Also, when it is desired to prepare polyorganosiloxane particles having an average particle size of not more than 0.1 μm and a narrow particle size distribution, it is preferable to carry out the polymerization in multistages. For example, 1 to 20% by weight of an emulsion comprising emulsified droplets of not less than several micrometers obtained by emulsifying the polyorganosiloxane-forming component, water and emulsifier by means of mechanical shearing thereof is previously subjected to emulsion polymerization under an acidic condition, and the remaining emulsion is then added and polymerized in the presence of the produced polyorganosiloxane as seeds. In case of preparing the polyorganosiloxane particles in such a manner, it is possible to control the average particle size within the range of 0.02 to 0.1 μm depending on the amount of an emulsifier used, and also to control the variation coefficient in the particle size distribution to not more than 60%. More preferable is a multistage polymerization method wherein a vinyl (co)polymer prepared by homo- or copolymerizing a vinyl monomer such as styrene, butyl acrylate or methyl acrylate in a usual emulsion polymerization manner is used as seeds instead of the previously produced polyorganosiloxane in the above multisatge polymerization, and a multistage polymerization is carried out in the same manner as above. According to such a method, it is possible to control the average particle size of the obtained polyorganosiloxane particles (modified polyorganosiloxane particles) within the range of 0.01 to 0.1 μm, and the variation coefficient in the particle size distribution to not more than 50% depending on the amount of an emulsifier used.

The variation coefficient in the particle size distribution of the polyorganosiloxane crosslinked particles obtained by these methods is preferably from 10 to 100%, more preferably from 20 to 80%, from the viewpoint of good flame resistance-impact resistance balance.

The emulsion droplets of not less than several micrometers can be prepared by using a high speed agitating machine such as a homomixer.

In the above-mentioned emulsion polymerization are used emulsifiers which do not lose an emulsifying ability under an acidic condition. Examples of the emulsifier are, for instance, alkylbenzenesulfonic acid, sodium alkylbenzenesulfonate, alkylsulfonic acid, sodium alkylsulfonate, sodium (di)alkyl sulfosuccinate, sodium polyoxyethylene nonylphenyl ether sulfonate, sodium alkylsulfate, and the like. These may be used alone or in admixture thereof. Of these, from the viewpoint of a relatively high effect of stabilizing the emulsion, preferred are alkylbenzenesulfonic acid, sodium alkylbenzenesulfonate, alkylsulfonic acid, sodium alkylsulfonate, sodium (di)alkyl sulfosuccinate and benzylmethyldodecyl ammonium hydroxide. Further, alkylbenzenesulfonic acid and alkylsulfonic acid are particularly preferred since they also serves as a polymerization catalyst for the polyorganosiloxane-forming component.

The acidic condition is adjusted by adding an inorganic acid such as sulfuric acid or hydrochloric acid or an organic acid such as alkylbenzenesulfonic acid, alkylsulfonic acid or trifluoroacetic acid to the reaction system. The pH of the system is preferably from 1.0 to 3, more preferably from 1.2 to 2.5, from the viewpoints of corrosion of a plant and adequate rate of polymerization.

The polymerization temperature is preferably from 60 to 120° C., more preferably from 70 to 100° C., since the polymerization velocity is adequate.

Under an acidic condition, the Si—O—Si bond which constitutes the polyorganosiloxane backbone is in an equilibrium state between severance and formation, and this equilibrium varies depending on the temperature. For the purpose of stabilization of polyorganosiloxane chains, it is preferable to neutralize by addition of an aqueous solution of an alkali such as sodium hydroxide, potassium hydroxide or sodium carbonate. The equilibrium shifts to the formation side as the temperature lowers and, therefore, a polyorganosiloxane having a high molecular weight or a high degree of crosslinking is easy to be produced. Thus, when it is desired to obtain a polyorganosiloxane having a high molecular weight or a high degree of crosslinking, it is preferable that after conducting the polymerization of a polyorganosiloxane-forming component at a temperature of 60° C. or higher, the reaction mixture is cooled to room temperature or lower, maintained at that temperature for 5 to 100 hours and then neutralized.

Thus, an emulsion containing crosslinked particles of polyorganosiloxane is obtained. The polyorganosiloxane crosslinked particles, for example, when formed from the components (a-1), (a-2) and (b), have a network structure wherein usually these components are copolymerized at random and crosslinked. When the component (c) is further copolymerized, the polyorganosiloxane crosslinked particles have a crosslinked structure having polymerizable vinyl groups. Further, when the polymerizable vinyl groups are reacted to form crosslinkages between them by a radical reaction by means of a radical polymerization initiator, there are obtained those having a crosslinked structure wherein the polymerizable vinyl groups are chemically bonded to each other. The polyorganosiloxane crosslinked by radical reaction is preferable, since the polyorganosilixane particles are easy to handle when recovered from the emulsion.

The radical reaction can be conducted without particular restriction, for example, by a method wherein a radical polymerization initiator is added to the emulsion and the reaction is caused to proceed by thermally decomposing the initiator, or a method wherein the reaction is caused to proceed in a redox system using a reducing agent.

Examples of the radical polymerization initiator are an organic peroxide such as cumene hydroperoxide, tert-butyl hydroperoxide, benzoyl peroxide, tert-butylperoxy isopropylcarbonate, di-tert-butyl peroxide, tert-butylperoxy laurate or lauroyl peroxide; an inorganic peroxide such as potassium persulfate or ammonium persulfate; an azo compound such as 2,2'-azobisisobutylonitrile or 2,2'-azobis-2,4-dimethylvaleronitrile; and the like. Of these, organic peroxides and inorganic peroxides are preferably used from the viewpoint of a high reactivity.

Examples of the reducing agent used in the redox system are a mixture of ferrous sulfate/glucose/sodium pyrophosphate, a mixture of ferrous sulfate/dextrose/sodium pyrophosphate, a mixture of ferrous sulfate/sodium formaldehyde sulfoxylate/ethylenediamineacetate, and the like.

It is preferable that the radical polymerization initiator is used usually in an amount of 0.005 to 20 parts by weight, especially 0.01 to 10 parts by weight, more especially 0.03 to 5 parts by weight, per 100 parts by weight of the polyorganosiloxane-forming component used. If the amount of the initiator is less than 0.005 part by weight, the rate of reaction is low, so the production efficiency tends to be lowered, and if the amount is more than 20 parts by weight, heat generation during the reaction becomes large, so the production tends to become difficult.

The temperature in the radical reaction is preferably from 30 to 120° C., more preferably from 40 to 100° C., from the viewpoints of stability of the reaction system and production efficiency.

Further, so long as the content of the polyorganosiloxane component in the obtained polyorganosiloxane crosslinked particles is adjusted to not less than 80% by weight, peferably not less than 90% by weight, at least one vinyl monomer such as styrene, acrylonitrile, methyl methacryate, butyl methacrylate or glycidyl methacrylate can be graft-polymerized to the crosslinked polyorganosiloxane. If an adequate amount of a graft component compatible with thermoplastic resins as mentioned after is present, dispersion of the polyorganosiloxane crosslinked particles into the thermoplastic resins becomes good, so it is possible to raise the impact resistance. However, since the presence of the graft component tends to lower the flame resistance, it is preferable to adjust the content of the polyorganosiloxane component so as not to be less than 80% by weight.

Recovery of the polyorganosiloxane crosslinked particles in the form of a powder from emulsions of the polyorganosiloxane crosslinked particles obtained by emulsion polymerization is carried out by a conventional method, for example, by adding to the aqueous emulsion a metal salt such as calcium chloride, magnesium chloride or magnesium sulfate or an inorganic or organic acid such as hydrochloric acid, sulfuric acid, phosphoric acid or acetic acid to coagulate the emulsion, followed by washing with water or hot water, dehydration and drying of the deposited polymer. A spray drying method is also applicable.

The crosslinked particles agglomerate to increase the particle size when a solid powder is recovered from the emulsion, thus giving a powder having an average particle size of 0.01 to 2,000 μm, especially 0.01 to 1,000 μm. The variation coefficient in the particle size distribution is preferably from 10 to 100%, more preferably from 20 to 80%.

The thus obtained polyorganosiloxane crosslinked particles (in the form of a solid powder or an emulsion) provide thermoplastic resin compositions having an excellent flame resistance-impact resistance balance by the incorporation into thermoplastic resins.

Examples of the thermoplastic resin are, for instance, acrylonitrile-styrene copolymer, acrylonitrile-butadiene rubber-styrene copolymer (ABS resin), acrylonitrile-butadiene rubber-α-methylstyrene copolymer, styrene-butadiene rubber-acrylonitrile-N-phenylmaleimide copolymer, acrylonitrile-acrylic rubber-styrene copolymer (AAS resin), acrylonitrile-acrylic rubber-α-methylstyrene copolymer, styrene-acrylic rubber-acrylonitrile-N-phenylmaleimide copolymer, acrylonitrile-ethylenepropylene rubber-styrene copolymer (AES resin), polycarbonate, polyester such as polyethylene terephthalate or polybutylene terephthalate, polyvinyl chloride, polypropylene, polyphenylene ether, polystyrene, polymethyl methacrylate, methyl methacrylate-styrene copolymer, polyamide, and the like. These may be used alone or in admixture thereof.

It is preferable, from the viewpoint of a balance of physical properties, that the amount of the polyorganosiloxane crosslinked particles is from 0.1 to 50 parts by weight, especially from 1 to 30 parts by weight, per 100 parts by weight of a thermoplastic resin. If the amount is too small, no effect of the addition is obtained, and if the amount is too large, it is difficult to maintain the properties such as rigidity and surface hardness of the thermoplastic resins.

Mixing of a thermoplastic resin with a solid powder of the polyorganosiloxane crosslinked particles isolated from the emulsion as mentioned above can be carried out by firstly mixing them through a Henschel mixer, a ribbon mixer or the like and then melt-kneading the mixture through a roll mill, an extruder, a kneader or the like.

The thermoplastic resin composition can also be obtained by mixing an emulsion of a thermoplastic resin with an emulsion of the polyorganosiloxane crosslinked particles and subjecting the mixed emulsion to coprecipitation of polymer particles.

The thermoplastic resin compositions of the present invention may contain usual additives, e.g., plasticizer, stabilizer, lubricant, ultraviolet absorber, antioxidant, known flame retardant, pigment, glass fiber, filler, high molecular processing aid, high molecular lubricant, impact modifier and antisagging agent. Preferable examples of the high molecular processing aid are, for instance, methacrylate (co)polymers such as methyl methacrylate-butyl acrylate copolymer. Preferable examples of the impact modifier are, for instance, MBS resin, acrylic rubber-containing graft copolymer and graft copolymer containing composite rubber of acrylic rubber and silicone rubber. Preferable examples of the antisagging agent are, for instance, fluorocarbon resin such as polytetrafluoroethylene.

Molding methods conventionally used for thermoplastic resin compositions, e.g., injection molding, extrusion, blow molding and calendering, are applicable to the thermoplastic resin compositions of the present invention.

The obtained molded articles have excellent properties such as flame resistance and impact resistance.

The present invention is more specifically explained by means of examples, but it is to be understood that the present invention is not limited to only these examples. In the examples, all parts and % excepting variation coefficient are by weight unless otherwise noted.

In the following examples and comparative examples, measurement and evaluation were made in the following manners.

[Polymerization Conversion]

An emulsion was dried in a hot air dryer at 120° C. for 1 hour to measure the content of solid matter of a polyorganosiloxane. The polymerization conversion was calculated according to the equation: (solid matter content/amount of monomers charged)×100 (%).

[Content of Toluene-insoluble Matter]

In 80 ml of toluene was immersed 0.5 g of the polyorganosiloxane crosslinked particles obtained from an emulsion by drying it at room temperature for 24 hours, and it was centrifuged at 12,000 r.p.m. for 60 minutes to measure the content (% by weight) of the toluene-insoluble matter in the polyorganosiloxane crosslinked particles.

[Average Particle Size]

Average particle size of an emulsion of polyorganosiloxane crosslinked particles:

Using a measuring apparatus, NICOMP MODE L370 Particle Size Analyzer made by PACIFIC SCIENTIFIC CO., the volume average particle size ($\mu$m) and the variation coefficient in particle size distribution (standard deviation/volume average particle size)×100 (%) were measured by a light scattering method.

Average Particle Size of Solid Powder

Using a measuring apparatus, MICROTRAC FRA made by LEED & NORTHRUP INSTRUMENTS, the volume average particle size ($\mu$m) and the variation coefficient in particle size distribution (standard deviation/volume average particle size)×100 (%) were measured by a light scattering method.

[Izod Impact Strength]

The Izod impact strength was measured at 23° C. by using a notched ¼ inch bar or a notched ⅛ inch bar according to ASTM D-256.

[Flame Resistance]

Evaluation was made by UL94 V test or UL94 HB test.

[Surface Appearance]

The test specimen used in the evaluation of flame resistance was visually observed and the surface appearance was evaluated according to the following criteria.

◯: The surface state is good.

Δ: A stripe pattern is observed in the surface.

×: A stripe pattern and peeling are observed in the surface.

The raw materials used are shown below.

PC: Polycarbonate, TOUGHRON A-2200 made by Idemitsu Sekiyu Kagaku Kabushiki Kaisha PET: Polyethylene terephthalate, BELPET EFG-70 made by Kanebo, Ltd.

PBT: Polybutylene terephthalate, CELANEX 1600A made by Hoechst Celanese Corp.

PTFE: Polytetrafluoroethylene, POLYFLON FA-500 made by Daikin Industries, Ltd.

AAS: AAS resin prepared in Example 9

Si-1: Polyorganosiloxane crosslinked particles prepared in Example 1

Si-2: Polyorganosiloxane crosslinked particles prepared in Example 2

Si-3: Polyorganosiloxane crosslinked particles prepared in Example 3

Si-4: Polyorganosiloxane crosslinked particles prepared in Example 4

Si'-1: Crosslinked polyorganosiloxane prepared in Com. Ex. 1

Si'-2: Linear polyorganosiloxane prepared in Com. Ex. 2

EXAMPLE 1

Preparation of Polyorganosiloxane Crosslinked Particles Si-1

In a homomixer, 80 parts of octamethylcyclotetrasiloxane (D4), 3 parts of tetraethoxysilane (TEOS), 12 parts of methyltrimethoxysilane (MTS), 5 parts of mercaptopropyldimethoxymethylsilane (MPrDMS), 1 part of dodecylbenzenesulfonic acid (DBSA) and 300 parts of pure water were stirred at 10,000 r.p.m. for 10 minutes to give an emulsion. The emulsion was charged in a five-necked flask equipped with a stirrer, a reflux condenser, an inlet for introducing nitrogen gas, an inlet for introducing monomers and a thermometer. After elevating the temperature to 80° C. over about 30 minutes, the reaction was carried out for 6 hours. The reaction mixture was cooled to 25° C. and maintained for 20 hours, and the pH of the system was then adjusted to 8.2 with sodium hydroxide to finish the polymerization. Subsequently, to the resulting emulsion was added 2 parts of calcium chloride to coagulate the emulsion, followed by dehydration and drying, thus giving a powder comprising polyorganosilixane crosslinked particles (Si-1). The polymerization conversion, the average particle size of the emulsion of polyorganosiloxane crosslinked particles, the average particle size after coagulation and drying of the emulsion and the content of toluene-insoluble matter were measured. The results are shown in Table 1.

EXAMPLE 2

Preparation of Polyorganosiloxane Crosslinked Particles Si-2

In a homomixer, 60 parts of D4, 3 parts of TEOS, 5 parts of MTS, 2 parts of acryloyloxypropyltrimethoxysilane (TSA), 6 parts of DBSA and 300 parts of pure water were stirred at 10,000 r.p.m. for 10 minutes to give an emulsion. The emulsion was charged in a five-necked flask equipped with a stirrer, a reflux condenser, an inlet for introducing nitrogen gas, an inlet for introducing monomers and a thermometer. After elevating the temperature to 80° C. over about 30 minutes, the reaction was carried out for 1 hour. Then, 30 parts of diphenyldimethoxysilane was added dropwise over 3 hours, and the reaction was further carried out for 2 hours. The reaction mixture was cooled to 25° C. and maintained for 20 hours, and the pH of the system was then adjusted to 8.0 with sodium hydroxide to finish the polymerization.

The resulting emulsion was maintained at 60° C., added with 0.2 part of tert-butylperoxyisopropylcarbonate (t-BIC) and stirred for 10 minutes. Subsequently, to the emulsion were added 0.02 part of formaldehyde sodium sulfoxylate (SFS), 0.01 part of disodium ethylenediaminetetraacetate (EDTA) and 0.002 part of ferrous sulfate, and the emulsion was stirred for 2 hours to go ahead with formation of crosslinkages by radical reaction.

To the obtained emulsion was added 2 parts of calcium chloride to coagulate the emulsion, followed by dehydration and drying, thus giving a powder comprising polyorganosilixane crosslinked particles (Si-2). The results are shown in Table 1.

EXAMPLE 3

Preparation of Polyorganosiloxane Crosslinked Particles Si-3

A five-necked flask equipped with a stirrer, a reflux condenser, an inlet for introducing nitrogen gas, an inlet for introducing monomers and a thermometer was charged with the following ingredients.

| Ingredients | Amount (part) |
|---|---|
| Pure water | 189 |
| Sodium dodecylbenzenesulfonate (SDBS) | 1.5 |

The temperature was then raised to 70° C. with purging the system with nitrogen gas. Subsequently, after adding 1 part of pure water and 0.01 part of potassium persulfate to the system, a vinyl polymer-forming component composed of the following ingredients was added at a time to the system, and was stirred for 1 hour to complete the polymerization, thus giving a latex of ST-BA copolymer.

| Ingredients | Amount (part) |
|---|---|
| Styrene (ST) | 1.34 |
| Butyl acrylate (BA) | 0.66 |

The polymerization conversion was 99%, and the obtained latex had a solid content of 3.3%, a number average particle size of 0.01 μm and a variation coefficient of 38%. Also, the content of toluene-insoluble matter in the ST-BA copolymer was 0%.

Separately, an emulsion of polyorganosiloxane-forming component was prepared by stirring a mixture of the following ingredients at 10,000 r.p.m. for 5 minutes with a homomixer.

| Ingredients | Amount (part) |
|---|---|
| Pure water | 70 |
| SDBS | 1.5 |
| D4 | 51 |
| TSA | 5 |
| TEOS | 2 |

Subsequently, the latex containing ST-BA copolymer was kept at 80° C., and thereto were added 2 parts of DBSA and 18 parts of pure water to adjust the system to pH 1.2. The above emulsion of polyorganosiloxane-forming component was added at a time to the latex. After stirring for 1 hour, 40 parts of diphenyldimethoxysilane was added dropwise over 3 hours. After the completion of the addition, the system was stirred for 2 hours and was adjusted to pH 8.9 with sodium hydroxide to finish the polymerization.

The obtained emulsion was kept at 60° C., and thereto was added 0.2 part of t-BIC in a nitrogen stream, followed by stirring for 10 minutes. Subsequently, 0.02 part of SFS, 0.01 part of EDTA and 0.002 part of ferrous sulfate were added to the emulsion, and the emulsion was stirred for 2 hours to go ahead with formation of crosslinkages by radical reaction, thus giving an emulsion of polyorganosiloxane crosslinked particles (Si-3)

To the obtained emulsion was added 2 parts of calcium chloride to coagulate the emulsion, followed by dehydration and drying, thus giving a powder comprising polyorganosilixane crosslinked particles (Si-3). The results are shown in Table 1.

EXAMPLE 4

Preparation of Polyorganosiloxane Crosslinked Particles Si-4

A five-necked flask equipped with a stirrer, a reflux condenser, an inlet for introducing nitrogen gas, an inlet for introducing monomers and a thermometer was charged with 92 parts (solid matter) of the emulsion of polyorganosiloxane crosslinked particles (Si-3) obtained in Example 3.

The temperature of the system was then raised to 70° C. with purging the system with nitrogen gas. Subsequently, after adding 1 part of pure water and 0.02 part of potassium persulfate (KPS) to the system, 8 parts of methyl methacrylate was added at a time to the system, and was stirred for 1 hour to finish the graft polymerization.

To the obtained emulsion was added 2 parts of calcium chloride to coagulate the emulsion, followed by dehydration and drying, thus giving a powder comprising polyorganosilixane crosslinked particles (Si-4). The results are shown in Table 1.

Comparative Example 1

Preparation of Crosslinked Polyorganosiloxane Si'-1

In a homomixer, 99.6 parts of octamethyltetrasiloxane, 0.4 part of tetraethoxysilane, 1 part of dodecylbenzenesulfonic acid and 300 parts of pure water were stirred at 10,000 r.p.m. for 10 minutes to give an emulsion. The emulsion was charged in a five-necked flask equipped with a stirrer, a reflux condenser, an inlet for introducing nitrogen gas, an inlet for introducing monomers and a thermometer. After elevating the temperature to 80° C. over about 30 minutes, the reaction was carried out for 6 hours. The reaction mixture was cooled to 25° C. and maintained for 20 hours, and the pH of the system was then adjusted to 8.1 with sodium hydroxide to finish the polymerization. Subsequently, to the resulting emulsion was added 2 parts of calcium chloride to coagulate the emulsion, followed by dehydration and drying, thus giving a liquid crosslinked polyorganosilixane (Si'-1). The results are shown in Table 1.

Comparative Example 2

Preparation of Linear Polyorganosiloxane Si'-2

In a homomixer, 100 parts of octamethylcyclotetrasiloxane, 1 part of dodecylbenzenesulfonic acid and 300 parts of pure water were stirred at 10,000 r.p.m. for 10 minutes to give an emulsion. The emulsion was charged in a five-necked flask equipped with a stirrer, a reflux condenser, an inlet for introducing nitrogen gas, an inlet for introducing monomers and a thermometer. After elevating the temperature to 80° C. over about 30 minutes, the reaction was carried out for 6 hours. The reaction mixture was cooled to 25° C. and maintained for 20 hours, and the pH of the system was then adjusted to 7.8 with sodium hydroxide to finish the polymerization. Subsequently, to the resulting emulsion was added 2 parts of calcium chloride to coagulate the emulsion, followed by dehydration and drying, thus giving a liquid polyorganosilixane (Si'-2). The results are shown in Table 1.

obtained in Examples 1 to 4, a liquid crosslinked polyorganosiloxane (Si'-1) obtained in Comparative Example 1 or a liquid linear polyorganosiloxane (Si'-2) obtained in Comparative Example 2 were mixed according to the recipes shown in Table 2.

The obtained composition was melt-kneaded at 280° C. by a twin screw extruder (model TEX44SS made by The Japan Steel Works, Ltd.) to give pellets. The obtained pellets were molded by an injection molding machine (model FAS100B made by Kabushiki Kaisha FUNAC) at a cylinder temperature of 270° C. to give ⅛ inch test specimens for Izod impact test and ¹⁄₁₂ inch test specimens for flame resistance evaluation. Using these specimens, evaluation was made according to the methods described before.

The results are shown in Table 2.

TABLE 2

|  | Ex. 5 | Ex. 6 | Ex. 7 | Ex. 8 | Com. Ex. 3 | Com. Ex. 4 | Com. Ex. 5 |
| --- | --- | --- | --- | --- | --- | --- | --- |
| PC | 100 | 100 | 100 | 100 | 100 | 100 | 100 |
| PTFE | 5 | 5 | 5 | 5 | 5 | 5 | 5 |
| Si-1 | 6 | — | — | — | — | — | — |
| Si-2 | — | 6 | — | — | — | — | — |
| Si-3 | — | — | 6 | — | — | — | — |
| Si-4 | — | — | — | 6 | — | — | — |
| Si'-1 | — | — | — | — | 6 | — | — |
| Si'-2 | — | — | — | — | — | 6 | — |
| Impact resistance (kg · cm/cm) | 88 | 86 | 87 | 95 | 72 | 52 | 80 |
| Flame resistance V test | V-1 | V-0 | V-0 | V-1 | — | — | — |
| Surface appearance | ○ | ○ | ○ | ○ | x | x | ○ |

From Table 2, it is found that the flame resistance, impact resistance and surface appearance are excellnet when the polyorganosiloxane crosslinked particles (Si-1 to Si-4) of the present invention are used.

EXAMPLES 9 AND 10

Comparative Examples 6 to 8

Flame Proofing and Improvement in Impact Resistance of a Polycarbonate/polyester Resin Blend Pellets of polycarbonate resin (PC), pellets of polyethylene terephthalate resin (PET), pellets of polybutylene

TABLE 1

|  | Ex. 1 | Ex. 2 | Ex. 3 | Ex. 4 | Com. Ex. 1 | Com. Ex. 2 |
| --- | --- | --- | --- | --- | --- | --- |
| Polyorganosiloxane | Si-1 | Si-2 | Si-3 | Si-4 | Si'-1 | Si'-2 |
| Polymerization conversion (wt. %) | 88 | 87 | 88 | 88 | 89 | 88 |
| Average particle size of emulsion (μm) | 0.17 | 0.06 | 0.04 | 0.05 | 0.17 | 0.17 |
| Variation coefficient (%) | 25 | 30 | 25 | 25 | 30 | 30 |
| Average particle size after coagulation and driying (μm) | 220 | 210 | 350 | 230 | liquid | Liquid |
| Variation coefficient (%) | 70 | 65 | 48 | 49 | immeasurable | immeasurable |
| Content of toluene-insoluble matter (wt. %) | 90 | 93 | 70 | 75 | 23 | soluble |

EXAMPLES 5 TO 8

Comparative Examples 3 to 5

Flame Proofing and Improvement in Impact Resistance of Polycarbonate Resin

Pellets of polycarbonate resin (PC) and a powder of polyorganosiloxane crosslinked particles (Si-1 to Si-4)

terephthalate resin (PBT) and a powder of polyorganosiloxane crosslinked particles (Si-3) obtained in Example 3, a liquid crosslinked polyorganosiloxane (Si'-1) obtained in Comparative Example 1 or a liquid linear polyorganosiloxane (Si'-2) obtained in Comparative Example 2 were mixed according to the recipes shown in Table 3.

The obtained composition was melt-kneaded at 260° C. by a twin screw extruder (model TEX44SS made by The Japan Steel Works, Ltd.) to give pellets. The obtained pellets were molded by an injection molding machine (model FAS 100B made by Kabushiki Kaisha FUNAC) at a cylinder temperature of 260° C. to give 1/8 inch test specimens for Izod impact test and 1/12 inch test specimens for flame resistance evaluation. Using these specimens, evaluation was made according to the methods described before.

The results are shown in Table 3.

TABLE 3

|  | Ex. 9 | Ex. 10 | Com. Ex. 6 | Com. Ex. 7 | Com. Ex. 8 |
|---|---|---|---|---|---|
| PC | 90 | 90 | 90 | 90 | 90 |
| PET | 10 | — | 10 | — | 10 |
| PBT | — | 10 | — | 10 | — |
| PTFE | 5 | 5 | 5 | 5 | 5 |
| Si-3 | 10 | 10 | — | — | — |
| Si'-1 | — | — | 10 | — | — |
| Si'-2 | — | — | — | 10 | — |
| Impact resistance (kg·cm/cm) | 83 | 90 | 41 | 22 | 50 |
| Flame resistance V test | V-1 | V-1 | — | — | — |
| Surface appearance | ○ | ○ | X | X | ○ |

The mark "—" in the flame resistance V test denotes being below the standard.

From Table 3, it is found that the flame resistance, impact resistance and surface appearance are excellnet when the polyorganosiloxane crosslinked particles (Si-3) of the present invention are used.

EXAMPLES 11 AND 12

Comparative Examples 9 and 10

Flame Proofing and Improvement in Impact Resistance of AAS Resin (1) Preparation of AAS Resin Emulsion A five-necked flask equipped with a stirrer, a reflux condenser, an inlet for introducing nitrogen gas, an inlet for introducing monomers and a thermometer was charged with the following ingredients.

| Ingredients | Amount (part) |
|---|---|
| Pure water | 200 |
| Sodium dioctylsulfosuccinate | 0.005 |
| SFS | 0.4 |
| EDTA | 0.01 |
| Ferrous sulfate | 0.0025 |

The system was then maintained at 45° C. with stirring in a nitrogen stream, and 15% of the following monomer mixture was added at a time to the system at that temperature. After stirring for 1 hour, 0.3 part of sodium dioctylsulfosuccinate was added. Then, the remaining monomer mixture was added dropwise over 4 hours. After the completion of the dropwise addition, stirring was further continued for 1 hour to give a polybutyl acrylate rubber emulsion.

| Ingredients | Amount (part) |
|---|---|
| BA | 60 |
| Cumene hydroperoxide (CHP) | 0.1 |

The obtained emulsion had a solid content of 23% and an average particle size of 0.30 μm. The polymerization conversion of the above monomer mixture was 99%.

Subsequently, the temperature was kept at 65° C. and the following monomer mixture was added dropwise to the system over 4 hours. After the completion of the addition, stirring was further continued for 2 hours to give an emulsion of a polybutyl acrylate rubber-based graft copolymer.

| Ingredients | Amount (part) |
|---|---|
| St | 28 |
| Acrylonitrile (AN) | 12 |
| CHP | 0.1 |

The emulsion had a solid content of 33%. The polymerization conversion of the above monomer mixture was 99%.

Separately, an emulsion of an AN-St copolymer was prepared as follows:

A five-necked flask equipped with a stirrer, a reflux condenser, an inlet for introducing nitrogen gas, an inlet for introducing monomers and a thermometer was charged with the following ingredients.

| Ingredients | Amount (part) |
|---|---|
| Pure water | 200 |
| Sodium dioctylsulfosuccinate | 1.0 |
| SFS | 0.4 |
| EDTA | 0.01 |
| Ferrous sulfate | 0.0025 |

The system was then maintained at 65° C. with stirring in a nitrogen stream, and the following monomer mixture was added dropwise to the system over 6 hours. Also, 0.5 part portions of sodium dioctylsulfosuccinate were added to the system after 1 hour and 3 hours from the start of the polymerization. After the completion of the addition of the monomer mixture, stirring was further continued for 1 hour to give an AN-St copolymer emulsion.

| Ingredients | Amount (part) |
|---|---|
| St | 70 |
| AN | 30 |
| CHP | 0.2 |

The obtained emulsion had a solid content of 33%. The polymerization conversion of the above monomer mixture was 99%.

The AN-St copolymer emulsion was mixed with the graft copolymer emulsion so that the content of polybutyl acrylate rubber became 20% on the solid basis, thus giving an emulsion of AAS resin.

(2) Preparation of AAS Resin Composition

The obtained AAS resin emulsion was mixed with the emulsion of polyorganosiloxane crosslinked particles (Si-3)

obtained in Example 3 or the emulsion of linear polyorganosiloxane (Si'-2) obtained in Comparative Example 2 in the proportion shown in Table 4 on the solid basis. The resulting mixture was coagulated using 2 parts of calcium chloride, dehydrated and dried to give an AAS resin containing the polyorganosiloxane crosslinked particles or the linear polyorganosiloxane.

Into 100 parts of a powder of the thus obtained AAS resin were incorporated 0.2 part of a phenolic stabilizer (trade mark "AO-20", product of Asahi Denka Kogyo Kabushiki Kaisha) and 0.5 part of ethylenebisstearylamide. The mixture was melt-kneaded at 240° C. by a single screw extruder (model HW-40-28 made by Tabata Kikai Kabushiki Kaisha) to give pellets. Using the obtained pellets, ¼ inch specimens for Izod impact test and ⅛ inch specimens for flame resistance test were prepared and evaluated according to the methods described before.

The results are shown in Table 4.

TABLE 4

|  | Ex. 11 | Ex. 12 | Com. Ex. 9 | Com. Ex. 10 |
|---|---|---|---|---|
| AAS | 100 | 100 | 100 | 100 |
| Si-3 | 10 | 15 | — | — |
| Si'-2 | — | — | 10 | — |
| Impact resistance (kg·cm/cm) | 15 | 16 | 10 | 12 |
| Flame resistance |  |  |  |  |
| HB test | HB | HB | — | — |
| Surface appearance | ○ | ○ | Δ | ○ |

The mark "—" in the flame resistance HB test denotes being below the standard.

From Table 4, it is understood that the resin compositions containing the polyorganosiloxane crosslinked particles (Si-3) according to the present invention exhibit excellent flame resistance, impact strength and surface appearance.

INDUSTRIAL APPLICABILITY

The flame retardant of the present invention suitable for use in thermoplastic resins is a flame retardant of low environmental load which does not generate harmful gas at the time of burning, and flame retardant resin compositions having an excellent impact resistance can be obtained by the incorporation thereof into thermoplastic resins.

What is claimed is:

1. A flame retardant for thermoplastic resins comprising crosslinked particles having a toluene-insoluble matter content of at least 50% by weight and an average particle size of 0.01 to 2,000 μm, wherein said crosslinked particles are prepared by a process comprising the steps of polymerizing a polyorganosiloxane-forming component comprising (a-1) 2 to 70% by weight of at least one member selected from the group consisting of organosiloxanes having an aromatic group and difunctional silane compounds having an aromatic group, (a-2) 29 to 96.5% by weight of at least one member selected from the group consisting of organosiloxanes having no aromatic group and difunctional silane compounds having no aromatic group, (b) 0.5 to 39% by weight of at least one silane compound having a functionality of at least 3 and (c) 0.5 to 30% by weight of at least one polymerizable vinyl group-containing silane compound, the total thereof being 100% by weight, and crosslinking the resulting polyorganosiloxane with a radical polymerization initiator.

2. The flame retardant of claim 1, wherein said crosslinked particles of a polyorganosiloxane are prepared by an emulsion polymerization.

3. A flame retardant resin composition comprising a thermoplastic resin and 0.1 to 50% by weight of a flame retardant per 100 parts by weight of said thermoplastic resin, said flame retardant comprising crosslinked polyorganosiloxane particles having a toluene-insoluble matter content of at least 50% by weight and an average particle size of 0.01 to 2,000 μm, wherein said crosslinked particles are made of a member selected from the group consisting of a polyorganosiloxane, prepared from a polyorganosiloxane-forming component, a mixture of a polyorganosiloxane prepared from a polyorganosiloxane-forming component and 1 to 20% by weight of an organic polymer having no polyorganosiloxane segment, and a modified polyorganosiloxane prepared by emulsion-polymerizing a polyorganosiloxane-forming component in the presence of a polymer of vinyl monomer as seeds, and said polyorganosiloxane-forming component comprising (a-1) 0.5 to 70% by weight of at least one member selected from the group consisting of organosiloxanes having an aromatic group and difunctional silane compounds having an aromatic group, (a-2) 29.5 to 99% by weight of at least one member selected from the group consisting of organosiloxanes having no aromatic group and difunctional silane compounds having no aromatic group, (b) 0.5 to 50% by weight of at least one silane compound having a functionality of at least 3 and (c) 0 to 40% by weight of at least one-polymerizable vinyl group-containing silane compound, the total thereof being 100% by weight.

4. The composition of claim 3, wherein said thermoplastic resin is at least one member selected from the group consisting of acrylonitrile-styrene copolymer, acrylonitrile-butadiene rubber-styrene copolymer (ABS resin), acrylonitrile-butadiene rubber-α-methylstyrene copolymer, styrene-butadiene rubber-acrylonitrile-N-phenylmaleimide copolymer, acrylonitrile-acrylic rubber-styrene copolymer (AAS resin), acrylonitrile-acrylic rubber-α-methylstyrene copolymer, styrene-acrylic rubber-acrylonitrile-N-phenylmaleimide copolymer, acrylonitrile-ethylenepropylene rubber-styrene copolymer (AES resin), polycarbonate, polyester, polyvinyl chloride, polypropylene, polyphenylene ether, polystyrene, polymethyl methacrylate, methyl methacrylate-styrene copolymer and polyamide.

5. The composition of claim 3, wherein the content of polyorganosiloxane in said crosslinked particles is not less than 90% by weight.

6. The composition of claim 3, wherein said organic polymer is a member selected from the group consisting of butyl acrylate polymer, styrene-butyl acrylate copolymer, styrene-acrylonitrile copolymer and methyl methacrylate polymer.

7. The composition of claim 3, wherein said vinyl monomer is at least one member selected from the group consisting of styrene, butyl acrylate and methyl methacrylate.

8. A flame retardant resin composition comprising a thermoplastic resin and 0.1 to 50% by weight of a flame retardant per 100 parts by weight of said thermoplastic resin, said flame retardant comprising crosslinked particles having a toluene-insoluble matter content of at least 50% by weight and an average particle size of 0.01 to 2,000 μm, wherein said crosslinked particles are prepared by polymerizing a polyorganosiloxane-forming component comprising (a-1) 0.5 to 70% by weight of at least one member selected from the group consisting of organosiloxanes having an aromatic group and difunctional silane compounds having an aromatic group, (a-2) 29.5 to 99% by weight of at least one member selected from the group consisting of organosiloxanes having no aromatic group and difunctional silane compounds having no aromatic group, (b) 0.5 to 50% by weight of at least one silane compound having a functionality of at least 3 and (c) 0 to 40% by weight of at least one polymerizable vinyl group-containing silane compound, the total thereof being 100% by weight.

9. The composition of claim 8, wherein said thermoplastic resin is at least one member selected from the group consisting of acrylonitrile-styrene copolymer, acrylonitrile-butadiene rubber-styrene copolymer (ABS resin), acrylonitrile-butadiene rubber-α-methylstyrene copolymer, styrene-butadiene rubber-acrylonitrile-N-phenylmaleimide copolymer, acrylonitrile-acrylic rubber-styrene copolymer (AAS resin), acrylonitrile-acrylic rubber-α-methylstyrene copolymer, styrene-acrylic rubber-acrylonitrile-N-phenylmaleimide copolymer, acrylonitrile-ethylenepropylene rubber-styrene copolymer (AES resin), polycarbonate, polyester, polyvinyl chloride, polypropylene, polyphenylene ether, polystyrene, polymethyl methacrylate, methyl methacrylate-styrene copolymer and polyamide.

10. The composition of claim 8, wherein the content of said polyorganosiloxane in said crosslinked particles is not less than 90% by weight.

11. The composition of claim 8, wherein said crosslinked particles contain 1 to 20% by weight of an organic polymer having no polyorganosiloxane segment.

12. The composition of claim 11, wherein said organic polymer is a member selected from the group consisting of butyl acrylate polymer, styrene-butyl acrylate copolymer, styrene-acrylonitrile copolymer and methyl methacrylate polymer.

13. The composition of claim 8, wherein said crosslinked particles are prepared by multistage emulsion polymerization wherein a vinyl monomer is first polymerized and said polyorganosiloxane-forming component is then polymerized.

14. The composition of claim 8, wherein said crosslinked particles are a graft copolymer in which at least one vinyl monomer is graft-polymerized onto said polyorganosiloxane.

15. The composition of claim 14, wherein said vinyl monomer is at least one member selected from the group consisting of styrene, acrylonitrile, methyl methacrylate, butyl acrylate and glycidyl methacrylate.

16. The composition of claim 8, wherein the component (a-1) is at least one member selected from the group consisting of trimethyltriphenylcyclotrisiloxane, tetramethyltetraphenylcyclotetrasiloxane, diphenyldimethoxysilane, diphenyldiethoxysilane, diphenyldichlorosilane, phenylmethyldimethoxysilane and phenylmethyldichlorosilane.

17. The flame retardant of claim 1, wherein said flame retardant has a polyorganosiloxane content of not less than 80% by weight.

18. The flame retardant of claim 3, wherein said flame retardant has a polyorganosiloxane content of not less than 80% by weight.

19. The flame retardant of claim 8, wherein said flame retardant has a polyorganosiloxane content of not less than 80% by weight.

* * * * *